US011847062B2

(12) United States Patent
Nakra et al.

(10) Patent No.: US 11,847,062 B2
(45) Date of Patent: Dec. 19, 2023

(54) RE-FETCHING DATA FOR L3 CACHE DATA EVICTIONS INTO A LAST-LEVEL CACHE

(71) Applicant: ADVANCED MICRO DEVICES, INC., Santa Clara, CA (US)

(72) Inventors: Tarun Nakra, Austin, TX (US); Jay Fleischman, Merrill, WI (US); Gautam Tarasingh Hazari, Bangalore (IN); Akhil Arunkumar, Santa Clara, CA (US); William L. Walker, Ft. Collins, CO (US); Gabriel H. Loh, Bellevue, WA (US); John Kalamatianos, Boxborough, MA (US); Marko Scrbak, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/552,703

(22) Filed: Dec. 16, 2021

(65) Prior Publication Data

US 2023/0195643 A1 Jun. 22, 2023

(51) Int. Cl.
*G06F 12/0897* (2016.01)
*G06F 12/0891* (2016.01)

(52) U.S. Cl.
CPC ...... *G06F 12/0897* (2013.01); *G06F 12/0891* (2013.01); *G06F 2212/1028* (2013.01)

(58) Field of Classification Search
CPC ............ G06F 12/0891; G06F 12/0897; G06F 2212/1028
See application file for complete search history.

(56) References Cited

U.S. PATENT DOCUMENTS

| | | | |
|---|---|---|---|
| 6,397,302 B1 | 5/2002 | Razdan et al. | |
| 7,197,605 B2 | 3/2007 | Schmisseur et al. | |
| 10,402,329 B1* | 9/2019 | Vantrease | G06F 11/3037 |
| 2013/0151777 A1* | 6/2013 | Daly | G06F 12/0897 711/E12.024 |
| 2013/0151778 A1* | 6/2013 | Daly | G06F 12/0897 711/E12.024 |
| 2014/0281248 A1 | 9/2014 | Alameldeen et al. | |
| 2015/0149721 A1* | 5/2015 | Kannan | G06F 12/0888 711/122 |
| 2016/0203085 A1 | 7/2016 | Kranich et al. | |
| 2019/0087344 A1* | 3/2019 | Hijaz | G06F 12/128 |
| 2020/0371960 A1* | 11/2020 | Bhoria | G06F 12/0897 |
| 2020/0409867 A1 | 12/2020 | Colglazier | |
| 2022/0171712 A1* | 6/2022 | Reed | G06F 12/0811 |

OTHER PUBLICATIONS

International Search Report and Written Opinion issued in Application No. PCT/US2022/052973, dated Apr. 20, 2023, 9 pages.

* cited by examiner

*Primary Examiner* — Aracelis Ruiz (57) ABSTRACT

In response to eviction of a first clean data block from an intermediate level of cache in a multi-cache hierarchy of a processing system, a cache controller accesses an address of the first clean data block. The controller initiates a fetch of the first clean data block from a system memory into a last-level cache using the accessed address.

20 Claims, 5 Drawing Sheets

RE-FETCHING DATA FOR L3 CACHE DATA EVICTIONS INTO A LAST-LEVEL CACHE

BACKGROUND

To support execution of instructions, processing systems typically implement one or more compute complexes, each compute complex having one or more processor cores and a memory hierarchy having memory modules to store data to be accessed by the executing instructions. Each processor core is associated with one or more levels of caches that are local to the corresponding processor core and a main memory that stores a larger quantity of data that can be accessed by the executing instructions at the corresponding processor core. For example, many processing systems having multiple processor cores employ a hierarchy of multiple cache levels, including level 1 (L1), level 2 (L2), and level 3 (L3) caches having varying storage capacities and proximities to an associated processor core. In some processing systems, each processor core has separate instruction-specific and data-specific caches at level 1. In the cache hierarchy, each processor core is associated with one or more levels of caches that are private to a corresponding core (hereinafter, the "private caches"). The processing system further implements a shared cache, commonly referred to as an L3 cache, at another level of the cache hierarchy, wherein the L3 cache is shared among the processor cores of a compute complex (hereinafter, the "shared cache"). In some processing systems, a lowest level, or last-cache (LLC), separate from the L3 cache, is also shared among the processor cores of a compute complex.

Conventionally, data is transferred between memory and cache in blocks of fixed size. Such blocks include data stored in cache, referred to herein as cache lines, as well as other information. Further, such blocks may include data stored in multiple cache lines. When one or more cache lines is copied from memory into the cache, a cache entry is created. The cache entry typically includes the copied data as well as the requested memory location. To ensure memory coherency, the cache hierarchy is typically configured to implement a coherency protocol, wherein the caches of the hierarchy maintain coherency status information for their respective cache lines and communicate cache probes to other caches of the hierarchy to ensure that the rules of the coherency protocol are followed.

When a processor core reads from or writes to a location in memory, it first checks for a corresponding entry in the cache. The cache checks for the contents of the requested memory location in any cache lines that might contain that address. If the processor finds that the memory location is in the cache, a cache hit has occurred. However, if the processor does not find the memory location in the cache, a cache miss has occurred. In the case of a cache hit, the processor immediately reads or writes the data in the cache line. For a cache miss, the cache allocates a new entry and copies data from main memory to the newly allocated entry in the cache (i.e., the cache "fetches" the data from the main memory at that memory location, to the cache), and the request is fulfilled from the contents of the cache. To make room for the new entry on a cache miss, the cache may have to evict one of the existing entries.

The evicted data is referred to herein as "victim data" or "victimized data." Writes to cache that are not immediately mirrored to the main memory are marked as "dirty data," and the cache tracks which locations have been written over (e.g., via a write or modify instruction). Thus, victimized data that is no longer current in main memory (i.e., data that has been modified at the cache but not at main memory) is referred to herein as "dirty data," while data that is current (i.e., unmodified at the cache) is referred to herein as "clean data." Further, conventional exclusive caches require clean victim data to be evicted (e.g., from L3) to maintain coherency and cache exclusivity, which increases data movement in the fabric, consuming additional power and bandwidth.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In some processing environments, a last-level cache (LLC) of a multi-cache hierarchy may be substantially smaller than an L3 cache for a central processing unit (CPU), thus making it unfeasible to duplicate all data in the L3 cache into the LLC. Conventionally, when L3 cache data is evicted from the L3 cache, a processor caches the evicted cache data in the LLC by sending (e.g., propagating) the evicted cache data from the L3 cache to the LLC. These evictions thus cause a substantial amount of traffic between caches and consume substantial system resources and power.

FIGS. 1-5 illustrate techniques for caching clean victim data evicted from an intermediate level of a cache hierarchy by re-fetching the evicted data from system memory (e.g., from dynamic random access memory (DRAM)) into a LLC based on the clean victim addresses and thereby bypassing sending the evicted clean data from the L3 cache to the LLC. As used herein, the "intermediate" level of the cache hierarchy refers to any level of the cache hierarchy other than the LLC (i.e., any level of the cache hierarchy that is higher than the lowest level in the cache hierarchy). In some implementations, when clean victim data is evicted from a cache, one or more processor cores update a system probe filter, which tracks cache lines in the processing system to maintain coherency among the caches of the cache hierarchy. A data eviction module utilizes the address of the clean victim data in the system probe filter to re-fetch the victim data from system memory (e.g., DRAM) into the LLC, after sending the address (and not the entirety of the evicted clean data) to the LLC. Because sending only the address (as opposed to the evicted clean data) consumes relatively little system resources and power, the caching technique reduces traffic between caches and consumes substantially less system resources and power, with increased speed in caching from the L3 cache to the LLC.

Figure 1:
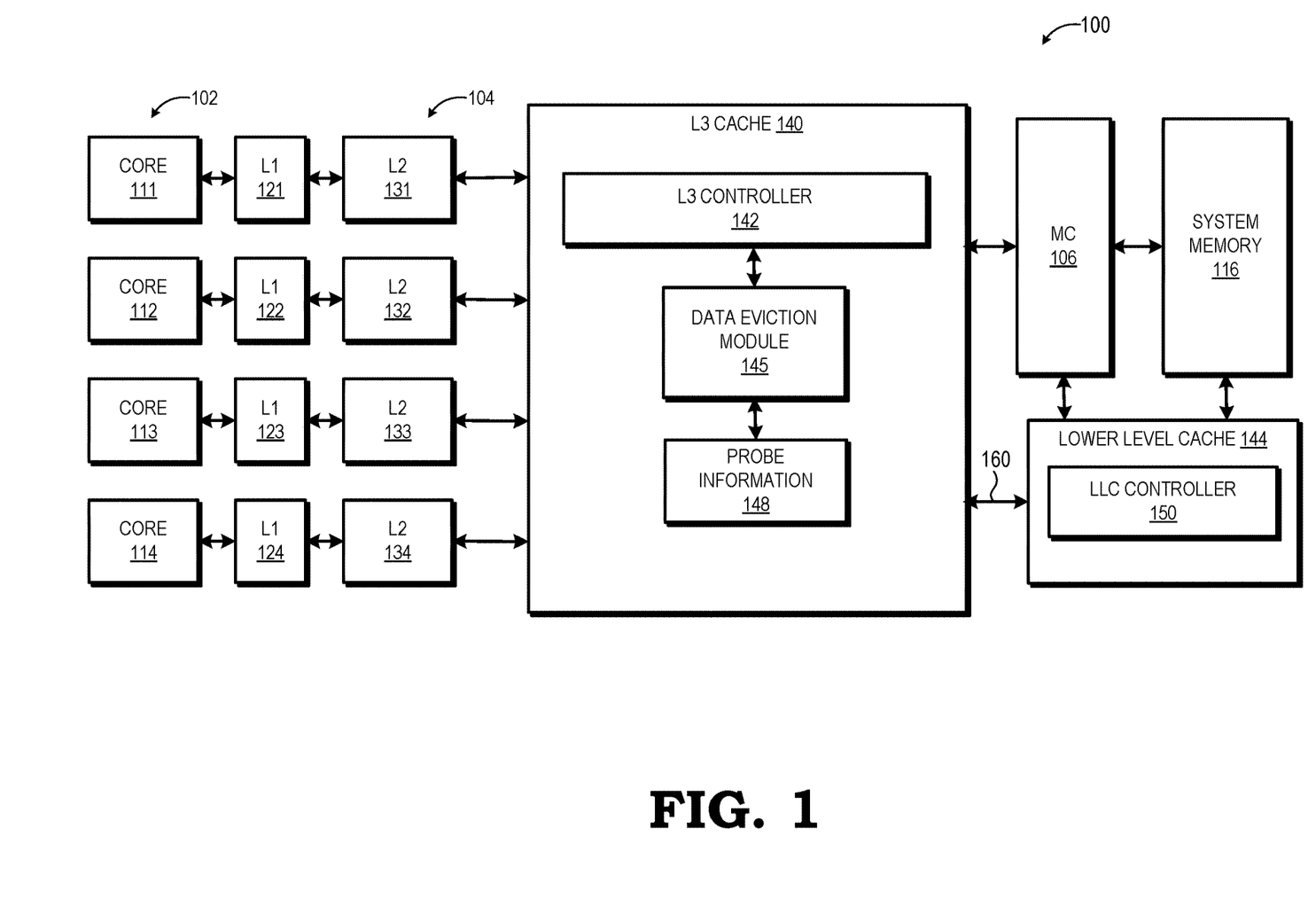
FIG. 1 is a block diagram of a multi-core processing system including a data eviction module to re-fetch from system memory to a last level cache clean data evicted from another level of a cache hierarchy, in accordance with some implementations.

FIG. 1 illustrates a processing system 100 including a data eviction module 145 for re-fetching clean cache victim data from system memory 116 to a last-level cache (LLC) 144, in accordance with at least some implementations. In the depicted example, the processing system 100 includes a compute complex 102, a cache hierarchy 104, the last-level cache (LLC) 144, a memory controller 106, and the system memory 116. In some implementations, the LLC 144 is implemented as part of the cache hierarchy 104. In some implementations, the LLC 144 is implemented as a memory-side cache structure, while the cache hierarchy is implemented as a processor-side cache structure. In some implementations, the LLC 144 and a memory controller 106 are implemented as a plurality of LLCs and memory controllers, with each respective LLC coupled to a respective memory controller.

The compute complex 102 includes a plurality of processor cores, such as the four processor cores 111, 112, 113, 114. The processor cores include, for example, central processing unit (CPU) cores, graphics processing unit (GPU) cores, digital signal processor (DSP) cores, or a combination thereof. It will be appreciated that the number of processor cores of the compute complex 102 may be fewer or more than four.

The memory controller 106 operates as the interface between the cache hierarchy 104, the LLC 144, and the system memory 116. Thus, data to be cached in the cache hierarchy 104 typically is manipulated as blocks of data referred to as "cache lines", and which are addressed or otherwise located in a memory hierarchy using a physical address of system memory 116. In some implementations, a "block" of data may include multiple cache lines, and/or other information. Cache lines are accessed from the system memory 116 by the memory controller 106 in response to memory requests from the cache hierarchy 104 and the LLC 114. Likewise, when a cache line containing modified data (i.e., "dirty data" or a "dirty data block") is evicted from the cache hierarchy 104 and thus needs to be updated in the system memory 116, the memory controller 106 manages this write-back process.

The cache hierarchy 104 includes two or more levels of caches. In the illustrated example, the cache hierarchy 104 includes three cache levels: level 1 (L1), level 2 (L2), and level 3 (L3). For L1, the compute complex 102 implements small private caches for each processing core, which are depicted as L1 caches 121, 122, 123, 124, each associated with a corresponding one of processor cores 111, 112, 113, 114. As discussed above, in some implementations, the cache hierarchy 104 further includes the LLC 144.

For L2, the compute complex 102 implements larger private caches for each processor core, which are depicted as L2 caches 131, 132, 133, 134 corresponding to processor cores 111, 112, 113, 114, respectively. Each of the L2 caches 131-134 is private to its corresponding processor core, but the cache hierarchy 104 operates to maintain coherency between the L2 caches 131-134. The L2 caches 131-134 can be direct mapped or n-way set associative caches in some implementations.

For the L3 caching level, the cache hierarchy 104 implements an L3 cache 140 that is shared by the processor cores of the compute complex 102, and thus shared by at least the L2 caches 131-134. The L3 cache 140 implements an L3 controller 142 and a data eviction module 145 to control evictions of data from the L3 cache 140.

The L3 cache 140 further includes a memory (not shown) storing probe information 148 to store address and state information for cache lines of the L2 caches 131-134. To this end, the memory storing probe information 148 is implemented as a cache, array, table, latches, flops, or other storage configuration. The probe information 148 tracks information for corresponding cache lines present in one of the L2 caches 131-134. The information stored as probe information 148 for corresponding cache lines includes, for example, the physical address (or portion thereof) of the cache line as well as state of the cache line at the L2 cache.

The probe information 148 is generally employed by the L3 cache 140 to respond to cache probes (not shown) generated by caches of the cache hierarchy 104. In particular, the L1 caches 121-124 and L2 caches 131-134, together with the L3 cache 140, implement a memory coherency protocol (referred to herein as simply a "coherency protocol"). Each cache line is associated with corresponding coherency information, as governed by the coherency protocol, to indicate the coherency state of the cache line, as well as how the cache line may be handled under the rules of the coherency protocol. For example, the coherency protocol may establish coherency states such as "modified" indicating that the cache line can be modified at the corresponding cache, "exclusive" indicating that the corresponding cache line cannot be modified at caches associated with other processor cores, and "shared", indicating that the cache line is shared by multiple caches of the cache hierarchy 104, and therefore should not be modified. For specified events, as defined by the particular coherency protocol implemented by the processing system, a cache of the cache hierarchy 104 can issue a cache probe to identify the coherency status of a given cache line at other caches. For example, prior to changing the coherency status of a cache line from shared to exclusive, a cache can issue a cache probe to identify whether the cache line is stored at any other cache and, if so, the coherency status of the cache line at the caches that store the cache line. Based on responses to the probe, the cache that issued the probe can take appropriate action, as required under the rules of the coherency protocol. For example, if no other caches store the cache line, the cache can change the state of the cache line from "shared" to "exclusive."

As indicated above, the memory storing probe information 148 stores information indicating the cache lines stored at each of the private caches of the cache hierarchy 104. In some implementations, the memory storing probe information 148 or an associated memory structure can also store the coherency information for the cache line on behalf of the corresponding cache. In response to a cache probe, the L3 controller 142 accesses the memory storing probe information 148 to determine whether any of the caches of the cache hierarchy 104 stores the cache line and, if so, the corresponding coherency information. Based on the probe information 148, the L3 controller 142 provides a response to the cache probe.

In some implementations, the L1 caches 121, 122, 123, 124, the L2 caches 131, 132, 133, 134, and the L3 cache 140 are inclusive, i.e., the outer level cache holds the contents of the inner-level cache. All fills (i.e., caching writes, for caching data) to the inner-level cache are also written to the outer level. Hence, fills to L1 121 are written to L2 131 and the L3 cache 140. However, the LLC 144 is exclusive to the L3 cache 140. To maintain exclusivity, fills to the L3 cache 140 are not written to the LLC 144. Instead, only the L3 cache 140 victim data is written to the LLC 144, thus ensuring that the data in the L3 cache 140 and LLC 144 is exclusive.

In execution, an execution pipeline for one or more of the processor cores 111, 112, 113, or 114 executes a load or store which accesses the L1 121 data cache. If data is not present in the L1 121 data cache (i.e., a miss at L1 121), the miss proceeds to the L2 cache 131. If the data is also not present in the L2 cache 131, the miss proceeds to the L3 cache 140. The L3 controller 142, upon determining that the L3 cache 140 also fails to have the data, sends an indication of a miss, via a coherent interconnect 160, to the LLC 144. An LLC controller 150, upon determining a miss in the LLC 144, sends a request to the memory controller 106 to fetch data from the system memory 116 (e.g., DRAM).

The data from the memory controller 106 bypasses the LLC 144 and is sent directly to the L3 cache 140. As a result, the data is filled into the L3 cache 140, the L2 cache 131, and the L1 data cache 121.

When the data is filled into the L1 121 data cache, the addition may cause another cache line in the L1 121 data cache to be displaced (i.e., evicted). If the evicted cache line was dirty, the cache line is sent to the L2 131 cache. Similarly, when data is filled into the L2 131 cache, it can cause a dirty L2 131 cache eviction which is written to the L3 cache 140. The fill in the L3 cache 140 can also cause the data eviction module 145 to process an L3 cache 140 eviction. Conventionally, both clean and dirty victim data evicted from the L3 cache 140 is propagated to the LLC 144 via the coherent interconnect 160. This write is performed because LLC 144 is exclusive and caches all data evicted from the L3 cache 140. However, propagating the L3 cache 140 victim data from the L3 cache 140 to the LLC 144 via the coherent interconnect 160 may consume substantial system resources and power.

To reduce data traffic across the coherent interconnect 160, the data eviction module 145 evicts only dirty victim data from the L3 cache 140 by propagating the cache line having the dirty victim data to the LLC 144 via the coherent interconnect 160. To facilitate caching clean data evicted from the L3 cache 140 at the LLC 144 without burdening the coherent interconnect 160, the data eviction module 145 sends only a victim address of the clean victim data (i.e., the address of the original data in the system memory 116) to the LLC 144 rather than the clean data itself because clean data is a copy of original data in the system memory 116. The data eviction module 145 thus initiates re-fetching the clean data directly from the system memory 116 to the LLC 144 and bypasses propagating the clean data from the L3 cache 140 to the LLC 144 via the coherent interconnect 160.

In some implementations, the L3 controller 142 sends the L3 cache 140 victim address to the system probe filter regardless of whether the LLC 144 is an inclusive LLC or an exclusive LLC. The L3 cache 140 victim address is typically sent to the system probe filter to maintain cache coherence across the processing system. Thus, the data eviction module 145 accesses the probe information 148 to determine the L3 cache 140 victim address of the clean victim data and sends the L3 cache 140 victim address of the clean victim data to the LLC 144. Propagating the L3 cache 140 victim address to the LLC 144 consumes relatively little bandwidth and power compared to propagating the clean victim data itself. In response to receiving the L3 cache 140 victim address at the LLC 144, the LLC controller 150 transforms the L3 cache 140 victim address into a system memory 116 read request to re-fetch the data associated with the victim address. The memory controller 106 returns the requested data from system memory 116 and caches the returned data into the LLC 144. Upon LLC 144 fill, the LLC controller 150 evicts any dirty victim data from the LLC 144 by writing the dirty victim data back to the system memory 116, via the memory controller 106. In this way, the data eviction module 145 reduces communication traffic between the caches and consumes substantially less system resources and power to propagate only the address(es) of clean victim data to the LLC 144, rather than propagating the clean victim data from the L3 cache 140 to the LLC 144, for evictions of clean data.

Figure 2:
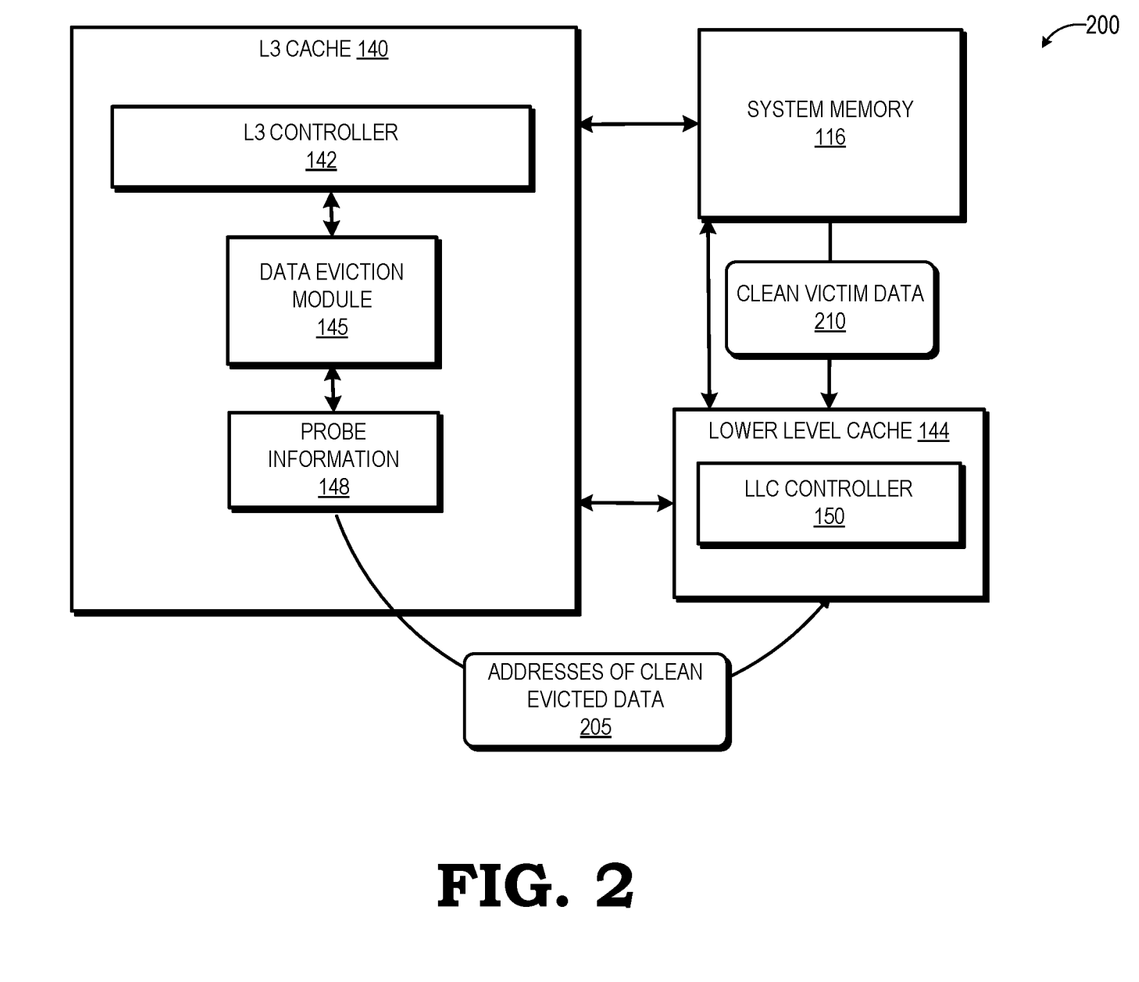
FIG. 2 is a block diagram of a portion of the processing system illustrating the data eviction module re-fetching clean victim data from system memory to the LLC in accordance with some implementations.

FIG. 2 shows a portion 200 of the processing system 100 of FIG. 1 illustrating the data eviction module 145 initiating a re-fetch of clean victim data 210 from system memory 116 to the LLC 144 in accordance with some implementations. In the depicted example, the data eviction module 145 indicates a clean data eviction from the L3 cache 140 by obtaining an address 205 of the clean evicted data from the probe information 148, as discussed above. The data eviction module 145 sends the address 205 of the clean evicted data to the LLC 144. In some implementations, the data eviction module 145 sends the address 205 of the clean evicted data to the LLC 144 by propagating the address 205 to the LLC 144 via the coherent interconnect 160. The LLC 144 then generates a read request (not shown) to read the clean victim data 210 and requests a read from the system memory 116 of the clean victim data 210 to the LLC 144 via the memory controller 106. In response to the read request, clean victim data 210 is returned to the LLC 144, for storage as cached data. In this way, the LLC 144 re-fetches the clean victim data 210 directly from the system memory 116 (e.g., DRAM), bypassing a propagation of the clean victim data 210 from the L3 cache 140.

In some implementations, if a memory interface is determined to be busy, or if a hit rate of the LLC 144 is determined to be low, then the clean victim data 210 is not inserted into the LLC 144. In such cases, in response to eviction of a clean data block from the L3 cache 140, the data eviction module 145 bypasses storing the clean data block in the LLC 144, based on a determination that the hit rate of the LLC 144 is below a predetermined threshold value, or that an interface between the system memory 116 and the LLC 144 currently has capacity below a predetermined threshold for fetching data.

In some implementations, in response to eviction of a clean data block from the L3 cache 140, the data eviction module 145 initiates propagation of the clean data block from the L3 cache 140 to the LLC 144, based on a determination that the coherent interconnect 160 between the L3 cache 140 and the LLC 144 currently has capacity above a predetermined threshold for propagating data, or that a current level of power usage is less than a predetermined threshold level of power usage.

Figure 3:
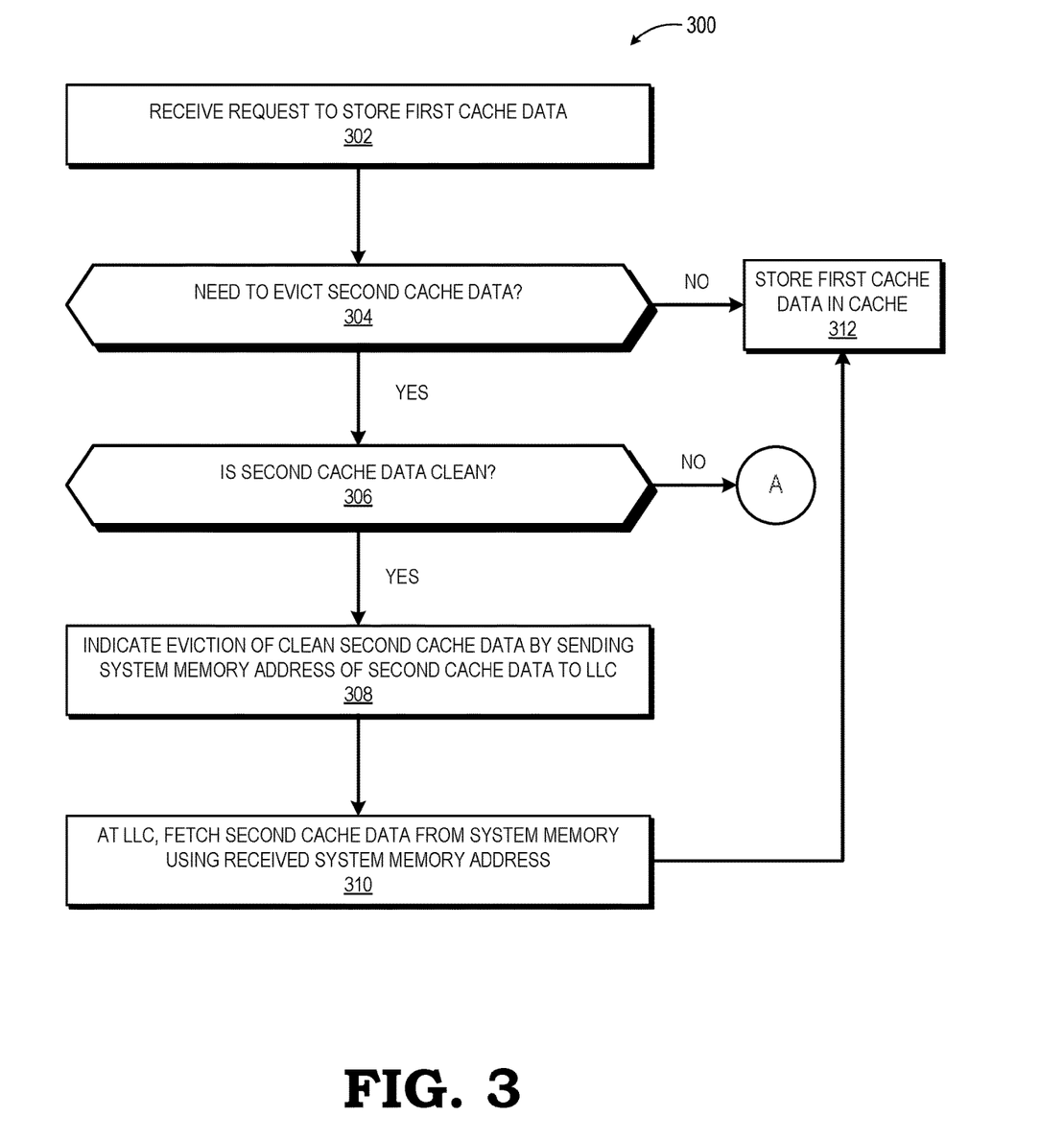
FIG. 3 is a flow diagram illustrating a method of evicting cache data from an L3 cache to an LLC using re-fetch of clean victim cache data from system memory at the LLC in accordance with some implementations.
Figure 4:
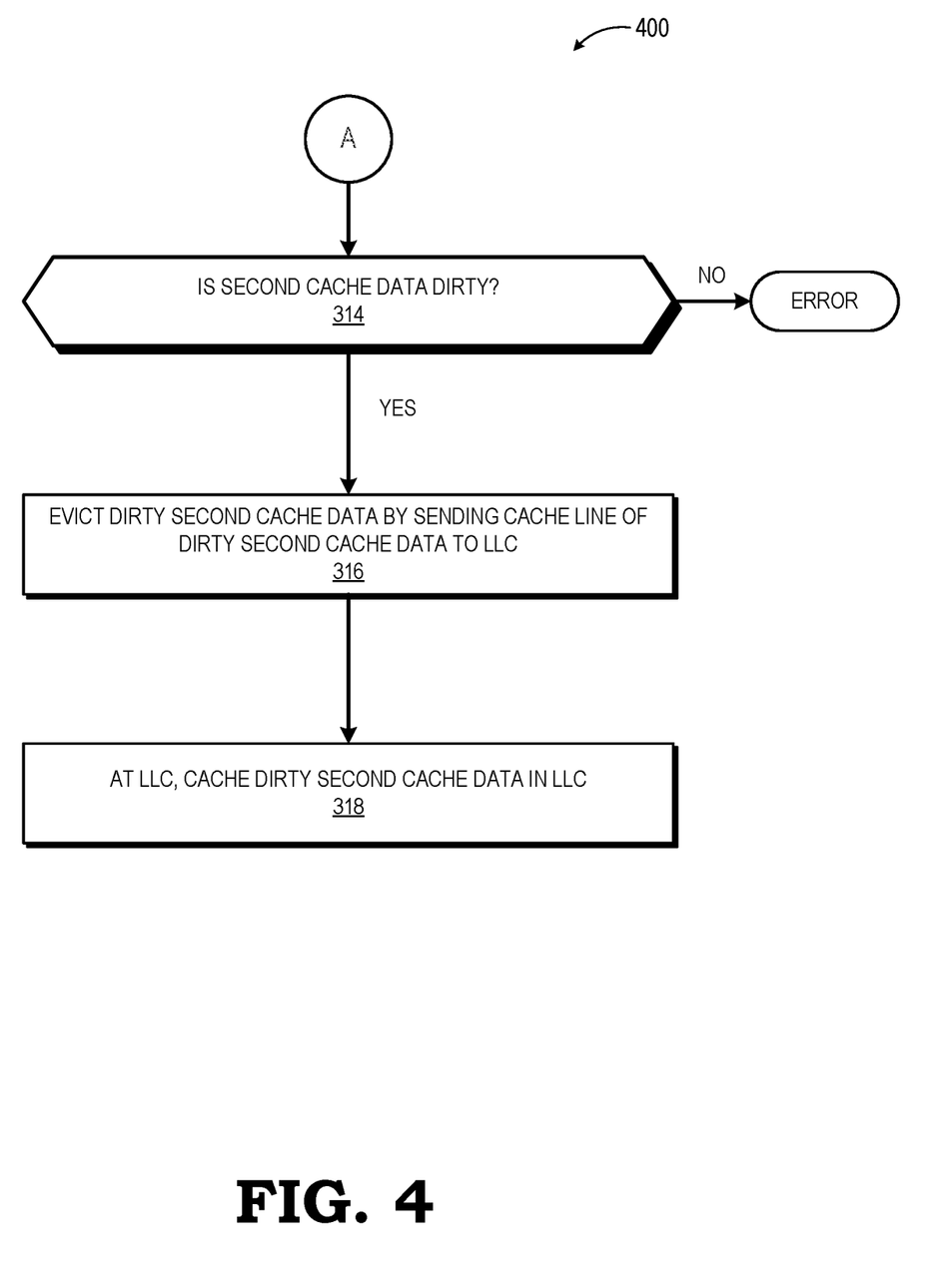
FIG. 4 is a flow diagram illustrating a continuation of the method of FIG. 3 in accordance with some implementations.

FIGS. 3 and 4 illustrate a method 300 of evicting cache data from an L3 cache, in accordance with some implementations. At step 302, the L3 controller 142 of FIG. 1 receives a request to store first cache data. At step 304, the L3 controller 142 determines whether a need exists to evict second cache data. In some implementations, the L3 controller 142 determines whether a threshold cache storage capacity for the L3 cache 140 is exceeded. If there exists a need to evict the second cache data, at step 306, the data eviction module 145 determines whether the second cache data is clean cache data, else the L3 controller 142 proceeds to step 312. In some implementations, the data eviction module 145 accesses the probe information 148 to determine whether a cache line of the second cache data has been modified since it was originally cached. If the second cache data is clean (e.g., the second cache data has not been modified since it was originally cached), at step 308, the data eviction module 145 indicates the clean second cache data eviction from the L3 cache 140 by sending the system memory address of the second cache data to the LLC 144, else the data eviction module 145 proceeds to step 314 of FIG. 4. In some implementations, the data eviction module 145 accesses the probe information 148 to obtain the system memory address of the second cache data and propagates the system memory address of the second cache data to the LLC 144 via the coherent interconnect 160. At step 310, the LLC controller 150 fetches the second cache data from the system memory 116 using the system memory address of the second cache data received from the data eviction module 145 (i.e., the LLC controller 150 re-fetches the clean second cache data from the system memory 116) and stores the fetched second cache data in the LLC 144. At step 312, the L3 controller stores the first cache data in the L3 cache 140.

At step 314 of FIG. 4, the data eviction module 145 determines that the second cache data is dirty, else signals an error. At step 316, the data eviction module 145 evicts the dirty second cache data from the L3 cache 140 by sending the cache line of the dirty second cache data to the LLC 144. In some implementations, the data eviction module 145 propagates the cache line of the dirty second cache data to the LLC 144 via the coherent interface 160. At step 318, the LLC controller receives the propagated dirty second cache data and initiates storage of the dirty second cache data in the LLC 144.

Thus, for clean cache data to be evicted from the L3 cache 140, the data eviction module 145 sends only the system memory address to the LLC 144 (i.e., not the entirety of the evicted clean cache data). In this way, the data eviction module 145 advantageously conserves significant system resources, time, and power.

Figure 5:
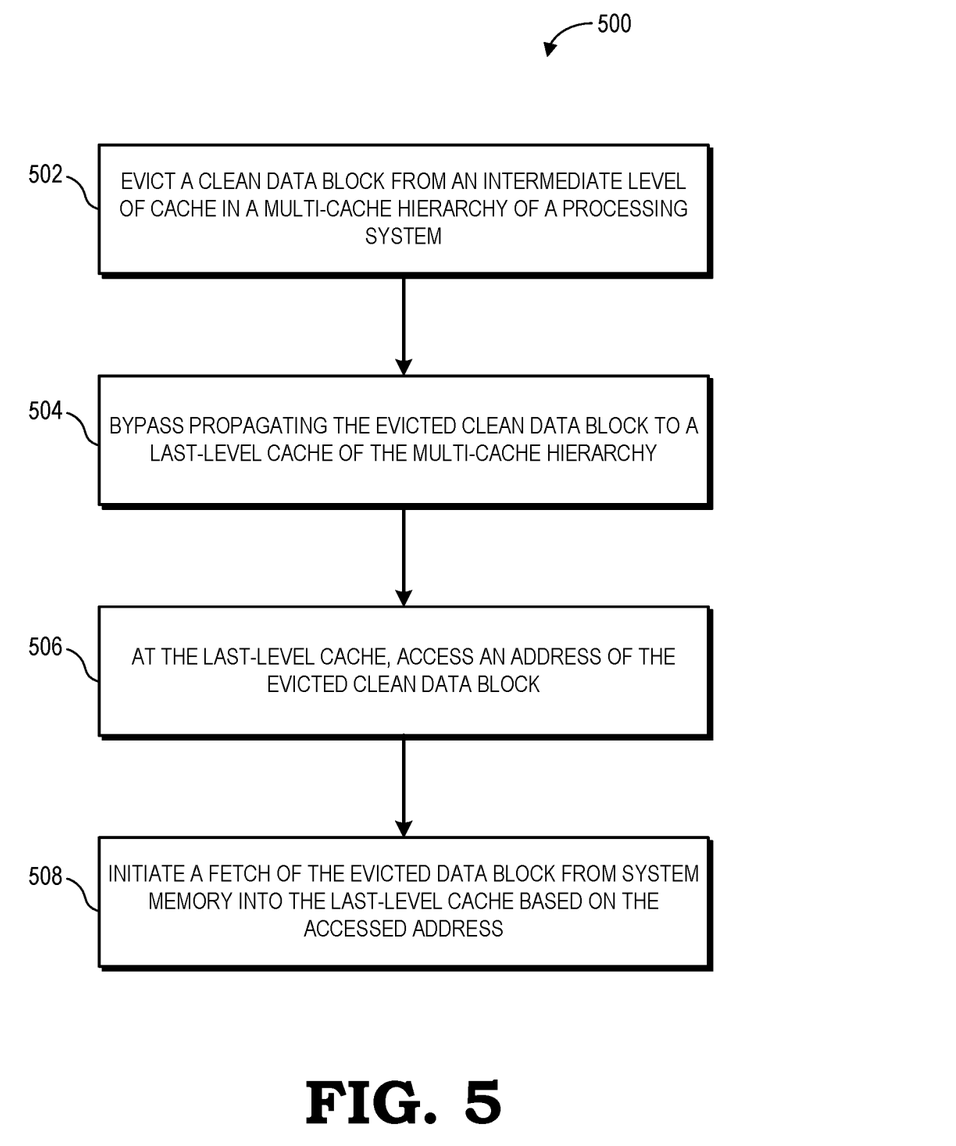
FIG. 5 is a flow diagram illustrating a method for re-fetching clean data evictions to a last-level cache (LLC) in accordance with some implementations.

FIG. 5 is a flow diagram illustrating a method for re-fetching clean data evictions to a last-level cache (LLC) in accordance with some implementations. At block 502, a clean data block is evicted from an intermediate level of cache in a multi-cache hierarchy of a processing system. For example, the data eviction module 145 evicts a clean data portion of data stored in the L3 cache 140 and initiates caching of the evicted portion in the LLC 144. The data eviction module 145 sends an address of the clean data portion to the LLC 144.

At block 504, the LLC bypasses propagating the evicted clean data block to the LLC. At block 506, the LLC 144 accesses an address of the evicted clean data block. For example, the LLC 144 receives the address from the data eviction module 145.

At block 508, the LLC initiates a fetch of the evicted clean data block from system memory based on the accessed address. For example, the LLC 144 initiates a read of the clean data block from the system memory 116. In this way, the data eviction module 145 advantageously causes reduced traffic between caches, and consumes substantially less system resources and power, with increased speed, in caching evicted cache data from the L3 cache 140 to the LLC 144.

In some implementations, the apparatus and techniques described above are implemented in a system including one or more integrated circuit (IC) devices (also referred to as integrated circuit packages or microchips), such as the processing system described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method comprising:
in response to eviction of a first clean data block from an intermediate level of cache, accessing an address of the first clean data block; and
initiating a fetch of the first clean data block from a system memory, into a last-level cache (LLC), using the address.

2. The method of claim 1, further comprising:
propagating the address of the first clean data block from the intermediate level of cache to the LLC.

3. The method of claim 1, further comprising:
in response to eviction of a first dirty data block from the intermediate level of cache, propagating the first dirty data block from the intermediate level of cache to the LLC.

4. The method of claim 3, wherein:
the first dirty data block comprises data that has been written to one or more caches of a cache hierarchy comprising the intermediate level of cache and the LLC via one or more of a write or modify instruction.

5. The method of claim 1, further comprising:
in response to eviction of a second clean data block from the intermediate level of cache, bypassing storing the second clean data block in the LLC, based on a determination that a hit rate of the LLC is below a predetermined threshold value, or that an interface between the system memory and the LLC currently has capacity below a predetermined threshold for fetching data.

6. The method of claim 1, further comprising:
in response to eviction of a second clean data block from the intermediate level of cache, propagating the second clean data block from the intermediate level of cache to the LLC, based on a determination that a coherent interconnect between the intermediate level of cache and the LLC currently has capacity above a predetermined threshold for propagating data, or that a current level of power usage is less than a predetermined threshold level of power usage.

7. The method of claim 1, wherein:
initiating the fetch of the first clean data block from the system memory comprises accessing a memory controller.

8. The method of claim 1, further comprising:
bypassing propagating the first clean data block from the intermediate level of cache to the LLC.

9. A processing system comprising:
a processor;
a system memory;
a multi-cache hierarchy; and a cache controller to:
in response to eviction of a first clean data block from an intermediate level of cache in the multi-cache hierarchy, access an address of the first clean data block, and
initiate a fetch of the first clean data block from the system memory, into a last-level cache (LLC), using the address.

10. The processing system of claim 9, wherein the cache controller is further to:
propagate the address of the first clean data block from the intermediate level of cache to the LLC.

11. The processing system of claim 9, wherein the cache controller is further to:
in response to eviction of a first dirty data block from the intermediate level of the cache, propagate the first dirty data block from the intermediate level of cache to the LLC.

12. The processing system of claim 11, wherein:
the first dirty data block comprises data that has been written to one or more caches of the multi-cache hierarchy via one or more of a write or modify instruction.

13. The processing system of claim 11, wherein the cache controller is further to:
in response to eviction of a second clean data block from the intermediate level of cache, bypassing storing the second clean data block in the LLC, based on a determination that a hit rate of the LLC is below a predetermined threshold value, or that an interface between the system memory and the LLC currently has capacity below a predetermined threshold for fetching data.

14. The processing system of claim 11, wherein the cache controller is further to:
in response to eviction of a second clean data block from the intermediate level of cache, propagate the second clean data block from the intermediate level of cache to the LLC, based on a determination that a coherent interconnect between the intermediate level of cache and the LLC currently has capacity above a predetermined threshold for propagating data, or that a current level of power usage is less than a predetermined threshold level of power usage.

15. The processing system of claim 9, wherein:
initiating the fetch of the first clean data block from the system memory comprises accessing a memory controller.

16. The processing system of claim 9, wherein the cache controller is further to:
bypass propagating the first clean data block from the intermediate level of cache to the LLC.

17. A method comprising:
in response to a request to store first cache data in an intermediate level of cache in a multi-cache hierarchy of a processing system, determining that a storage capacity of the intermediate level of cache is exceeded;
initiating an eviction of a first clean data block from the intermediate level of cache, the eviction including sending an address of the first clean data block to a last-level cache (LLC); and
in response to receiving the address at the LLC, caching the evicted first clean data block in the LLC by fetching the first clean data block from a system memory using the address sent from the intermediate level of cache.

18. The method of claim 17, further comprising:
in response to eviction of a first dirty data block from the intermediate level of cache, sending the first dirty data block from the intermediate level of cache to the LLC.

19. The method of claim 17, further comprising:
bypassing sending the first clean data block from the intermediate level of cache to the LLC.

20. The method of claim 17, further comprising:
obtaining the address of the first clean data block from system probe information stored in the intermediate level of cache.

\* \* \* \* \*